United States Patent
Hara

(10) Patent No.: US 9,128,529 B2
(45) Date of Patent: Sep. 8, 2015

(54) IMAGE PROCESSING DEVICE, IMAGE PROCESSING METHOD

(71) Applicant: FUJITSU LIMITED, Kawasaki-shi, Kanagawa (JP)

(72) Inventor: Nobuyuki Hara, Meguro (JP)

(73) Assignee: FUJITSU LIMITED, Kawasaki (JP)

( * ) Notice: Subject to any disclaimer, the term of this patent is extended or adjusted under 35 U.S.C. 154(b) by 105 days.

(21) Appl. No.: 14/108,912

(22) Filed: Dec. 17, 2013

(65) Prior Publication Data

US 2014/0232636 A1    Aug. 21, 2014

(30) Foreign Application Priority Data

Feb. 21, 2013    (JP) ................. 2013-032635

(51) Int. Cl.
*G06F 3/00*    (2006.01)
*G06F 3/01*    (2006.01)

(52) U.S. Cl.
CPC ...................... *G06F 3/017* (2013.01)

(58) Field of Classification Search
CPC ........... G06F 3/005; G06F 3/007; G06F 3/01; G02B 27/01; G02B 27/017; G02B 2027/0178; G02B 2027/014
See application file for complete search history.

(56) References Cited

U.S. PATENT DOCUMENTS 6,711,293 B1    3/2004    Lowe
2013/0069985 A1*    3/2013    Wong et al. ............ 345/633

FOREIGN PATENT DOCUMENTS

| JP | 2003-346162 | 12/2003 |
| JP | 2006-012042 | 1/2006 |
| JP | 2006-267887 | 10/2006 |
| JP | 2008-201101 | 9/2008 |
| JP | 2009-251154 | 10/2009 |

OTHER PUBLICATIONS

Herbert Bay et al. "SURF: Speeded Up Robust Features", Computer Vision and Image Understanding, vol. 110, No. 3, pp. 346-359, 2008.
Ryo Yamashita et al. "Hand Shape Recognition Using a Three-Dimensional Active Appearance Model", Meeting on Image Recognition Understanding, MIRU2012, IS3-70, Aug. 2012.

* cited by examiner

*Primary Examiner* — Regina Liang
(74) *Attorney, Agent, or Firm* — Staas & Halsey LLP

(57) ABSTRACT

An image processing device includes, a processor; and a memory which stores a plurality of instructions, which when executed by the processor, cause the processor to execute, acquiring an image including a subject recognized and a movement site of a user; recognizing the subject recognized and the movement site from the image; and controlling a display location, in the image, of an additional information image corresponding to the subject recognized, to a location other than the subject recognized and the movement site.

18 Claims, 10 Drawing Sheets

| FRAME NO. (N) | TX (PIXELS) | TY (PIXELS) | TX VARIATION AMOUNT (PIXELS) | TY VARIATION AMOUNT (PIXELS) |
|---|---|---|---|---|
| 100 | 308 | 164 | null | null |
| 101 | 324 | 162 | 16 | -2 |
| 102 | 328 | 194 | 4 | 32 |
| 103 | 302 | 202 | -26 | 8 |
| 104 | 286 | 168 | -16 | -34 |
| 105 | 290 | 208 | 4 | 40 |

FIG. 4

| FRAME NO. (N) | FINGER LOCATION | | RECOGNITION SUBJECT LOCATION | | FINGER MOVEMENT AMOUNT, MOVEMENT DIRECTION (ANGLE) | | | LOCATION DIRECTION OF RECOGNITION SUBJECT (DEGREES) | DIRECTION DIFFERENCE (DEGREES) |
|---|---|---|---|---|---|---|---|---|---|
| | HX (PIXELS) | HY (PIXELS) | TX (PIXELS) | TY (PIXELS) | HX VARIATION AMOUNT (PIXELS) | HY VARIATION AMOUNT (PIXELS) | MOVEMENT DIRECTION ANGLE (DEGREES) | | |
| 200 | 599 | 443 | 296 | 156 | null | null | null | 223.4 | null |
| 201 | 568 | 417 | 300 | 155 | -35 | -25 | 215.5 | 224.4 | 8.8 |
| 202 | 540 | 393 | 297 | 164 | -25 | -33 | 232.9 | 223.3 | 9.6 |
| 203 | 510 | 365 | 289 | 158 | -22 | -22 | 225.0 | 223.1 | 1.9 |
| 204 | 478 | 337 | 291 | 154 | -34 | -24 | 215.2 | 224.4 | 9.2 |
| 205 | 458 | 310 | 297 | 160 | -26 | -33 | 231.8 | 223.0 | 8.8 |

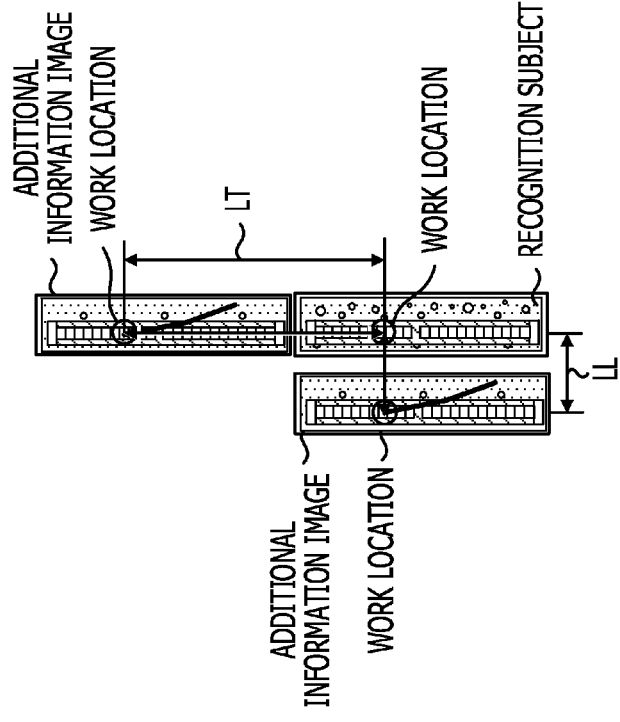
FIG. 6A
FIG. 6C
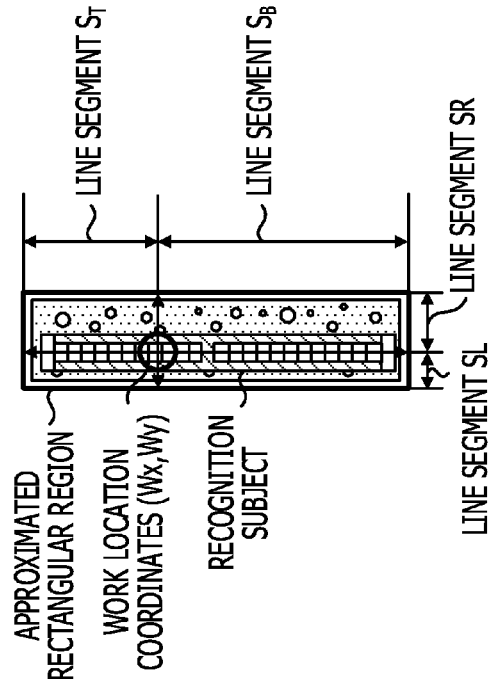
FIG. 6B
| BASIC DISTANCE $SO_T$ (PIXELS) TO UPPER SIDE OF APPROXIMATED RECTANGULAR REGION | BASIC DISTANCE $SO_L$ (PIXELS) TO LEFT SIDE OF APPROXIMATED RECTANGULAR REGION | BASIC DISTANCE $SO_B$ (PIXELS) TO LOWER SIDE OF APPROXIMATED RECTANGULAR REGION | BASIC DISTANCE $SO_R$ (PIXELS) TO RIGHT SIDE OF APPROXIMATED RECTANGULAR REGION |
|---|---|---|---|
| 8 | 1.6 | 11 | 2.4 |

//

IMAGE PROCESSING DEVICE, IMAGE PROCESSING METHOD

CROSS-REFERENCE TO RELATED APPLICATION

This application is based upon and claims the benefit of priority from the prior Japanese Patent Application No. 2013-032635 filed on Feb. 21, 2013, the entire contents of which are incorporated herein by reference.

FIELD

The embodiments discussed herein are related to an image processing device, an image processing method, and an image processing program used, for example, for the display of an additional information image that corresponds to a subject recognized and serves as work support information for a user.

BACKGROUND

In recent years, together with the growth of information communication technology, technology is being developed in relation to augmented reality with which a computer is used to add visual information to an image in which a real space (external environment) has been captured, and to display the image. For the display of the visual information, for the most part, a wearable device such as a head-mounted display (HMD) having a camera that acquires an image of the external environment mounted thereon is used, and detailed information (hereafter referred to as an additional information image) relating to a recognition subject (in other words, subject recognized) that is present in the line of sight of the user is superimposed on the image of the external environment and displayed.

Augmented reality technology is used to realize a function that supports the designation of a fault location when a fault occurs in an electronic device or the like, and supports fault repair work carried out by the user. For example, Japanese Laid-open Patent Publication No. 2008-201101 discloses technology with which, in the support of repair work for a paper jam fault in a copy machine, an operation procedure and an internal image of the copy machine which constitute an additional information image and are prepared in advance in association with a paper jam occurrence location are superimposed and displayed on the copy machine which constitutes the recognition subject. In this technology, because the additional information image conceals the recognition subject, technology that avoids concealment caused by the superimposition and display of the additional information image is also disclosed. For example, Japanese Laid-open Patent Publication No. 2006-12042 discloses technology for switching between displaying or not displaying the superimposition of an additional information image by the operation of a physical mechanism (switch). In addition, Japanese Laid-open Patent Publication No. 2009-251154 discloses technology for estimating the work state of the user on the basis of the amount of oscillation of the head of the user calculated from images captured by a camera mounted on the head, and switching between displaying or not displaying the superimposition of an additional information image.

SUMMARY

In accordance with an aspect of the embodiments, an image processing device includes, a processor; and a memory which stores a plurality of instructions, which when executed by the processor, cause the processor to execute, acquiring an image including a subject recognized and a movement site of a user; recognizing the subject recognized and the movement site from the image; and controlling a display location, in the image, of an additional information image corresponding to the subject recognized, to a location other than the subject recognized and the movement site.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

These and/or other aspects and advantages will become apparent and more readily appreciated from the following description of the embodiments, taken in conjunction with the accompanying drawing of which:

FIG. 4 is a drawing depicting an example of a table including the data structure of a movement vector of a movement site calculated by the calculation unit;

FIG. 6A is a relational diagram of the work location of a recognition subject and line segments of each side in an approximated rectangular region;

FIG. 6B is a drawing depicting an example of the data structure of line segments of each side in an approximated rectangular region;

FIG. 6C is a conceptual diagram of a display candidate location for an additional information image;

DESCRIPTION OF EMBODIMENTS

Hereafter, examples of an image processing device, an image processing method, and an image processing program according to one mode of embodiment are described in detail on the basis of the drawings. Furthermore, these embodiments do not restrict the disclosed technology.

Embodiment 1

Figure 1:
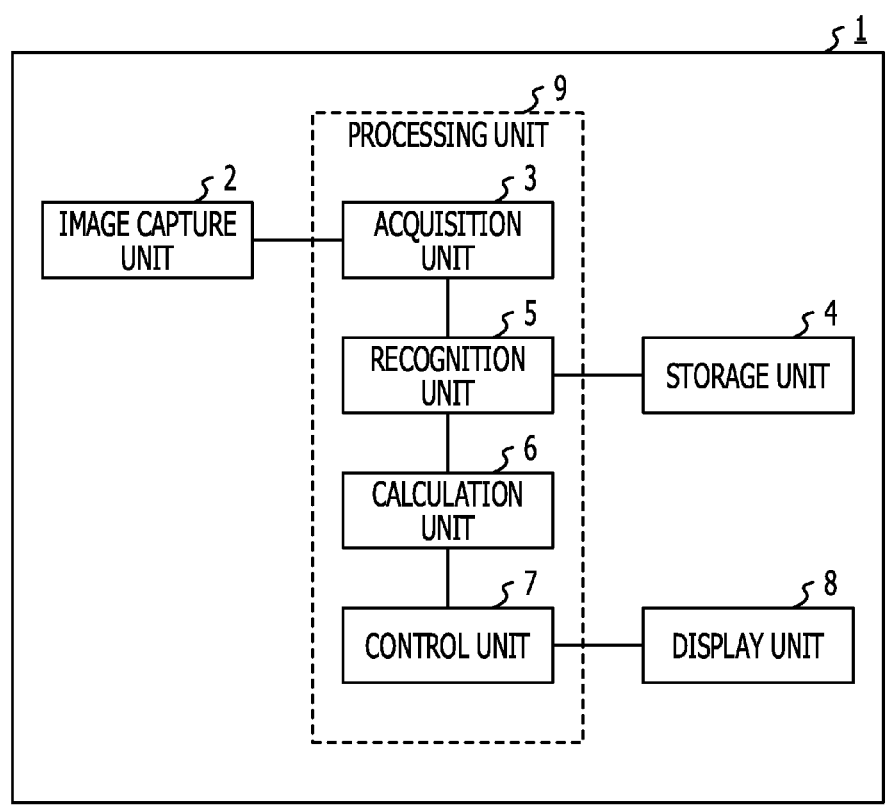
FIG. 1 is a functional block diagram of an image processing device according to one mode of embodiment.

FIG. 1 is a functional block diagram of an image processing device 1 according to one mode of embodiment. The image processing device 1 has an image capture unit 2, a storage unit 4, a display unit 8, and a processing unit 9. The processing unit 9 has an acquisition unit 3, a recognition unit 5, a calculation unit 6, and a control unit 7.

The image capture unit 2 is, for example, an image capture device such as a charge-coupled device (CCD) or a complementary metal-oxide semiconductor (CMOS) camera. The image capture unit 2 is, for example, securely held or mounted on the neck of the user, and acquires image data in the line of sight of the user. Furthermore, although the image capture unit 2 is arranged inside the image processing device 1 for convenience of description, it is also possible for the image capture unit 2 to be arranged outside of the image processing device 1 so as to enable access via a network. The image capture unit 2 captures an image including a recognition subject that is a work target for the user and a movement site of the user. The image capture unit 2 outputs the image including the recognition subject and the movement site of the user to the acquisition unit 3.

The acquisition unit 3 is, for example, a hardware circuit implemented by wired logic. In addition, the acquisition unit 3 may also be a function module realized a computer program executed by the image processing device 1. The acquisition unit 3 receives the image including the recognition subject and the movement site of the user from the image capture unit 2. In addition, it is also possible for the function of the image capture unit 2 to be combined with the acquisition unit 3. The acquisition unit 3 outputs a plurality of images including the recognition subject and the movement site of the user to the recognition unit 5 and the display unit 8.

The storage unit 4 is, for example, a storage device such as a flash memory or other like semiconductor memory element, or a hard disk or an optical disk. Furthermore, the storage unit 4 is not restricted to the aforementioned types of storage devices, and may also be a random-access memory (RAM) or a read-only memory (ROM). Feature points (which may also be referred to as first feature points or a first feature point group) of a plurality of recognition subjects (an electronic circuit board, manufacturing machinery, or the like) that are present in the external environment and are to be subjected to recognition processing by the recognition unit 5 are extracted in advance from images in which the recognition subject has been captured in advance, and are stored in the storage unit 4. In addition, the storage unit 4 may also store additional information images corresponding to recognition subjects. Moreover, with regard to the additional information images stored in the storage unit 4, one additional information image may be stored for one recognition subject, or a plurality of additional information images may be stored for one recognition subject.

Furthermore, although the storage unit 4 is arranged inside the image processing device 1 for convenience of description, it is also possible for the storage unit 4 to be arranged outside of the image processing device 1 so as to enable access via a network. In addition, the storage unit 4 stores a variety of programs executed by the image processing device 1 described hereafter, for example basic software such as the operating system (OS) and programs for which the activation of image processing is regulated. Moreover, a variety of data and so on that are important for the execution of these programs are also stored in the storage unit 4 in accordance with a desire. In addition, the variety of data stored in the storage unit 4 may be appropriately stored in the memory or cache, which is not depicted, of the recognition unit 5, the calculation unit 6, and the control unit 7 for example, and the image processing device 1 may be configured to not use the storage unit 4.

The recognition unit 5 is, for example, a hardware circuit implemented by wired logic. In addition, the recognition unit 5 may also be a function module realized a computer program executed by the image processing device 1. The recognition unit 5 receives a plurality of images from the acquisition unit 3. The recognition unit 5 extracts feature points from the plurality of images and, by associating the extracted feature points (which may also be referred to as second feature points or a second feature point group) with the feature points of recognition subjects stored in the storage unit 4, recognizes at least one recognition subject included in the plurality of images acquired by the acquisition unit 3.

Figure 2:
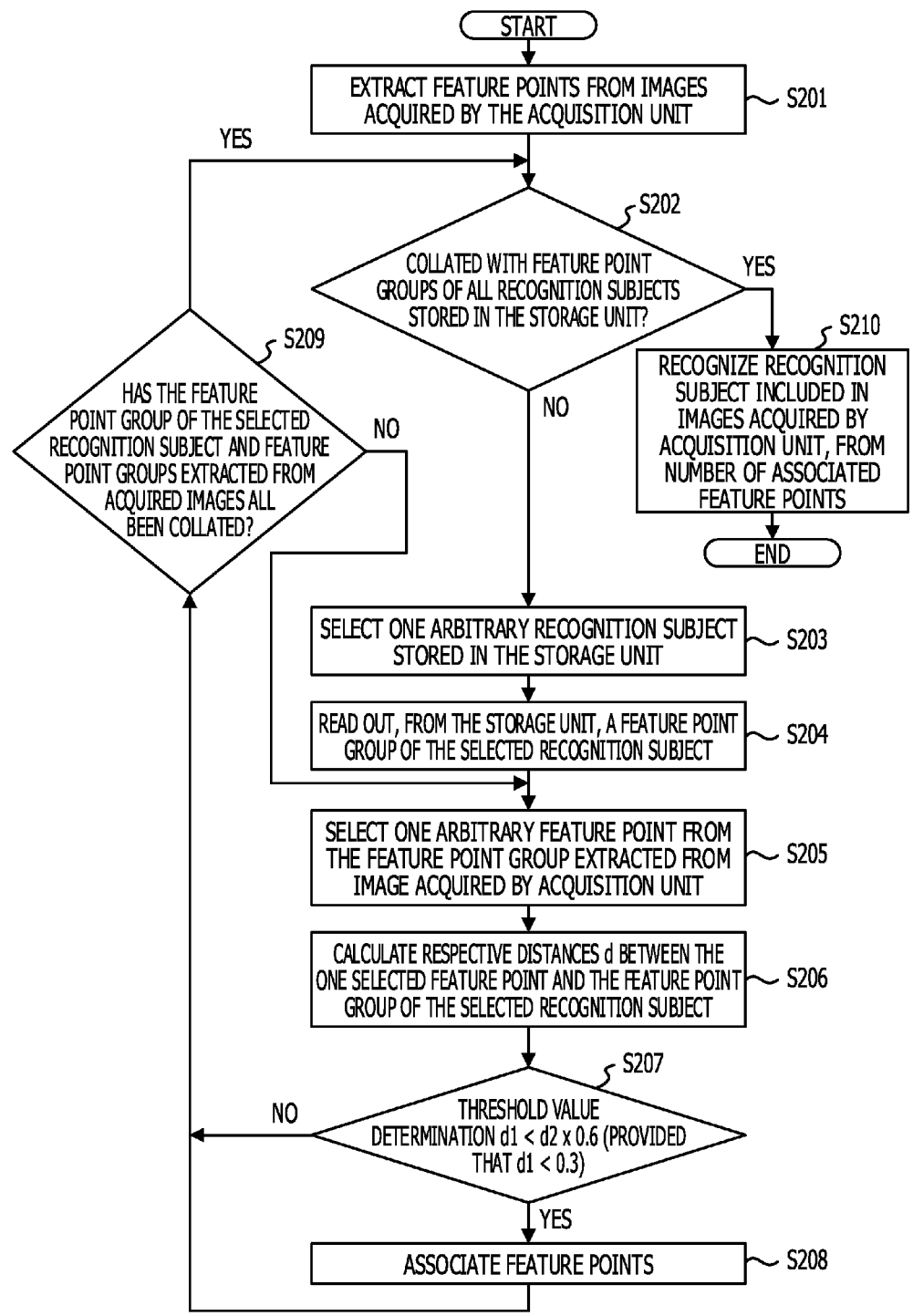
FIG. 2 is a flowchart for recognition processing of a recognition subject carried out by a recognition unit.

FIG. 2 is a flowchart for recognition processing of a recognition subject carried out by the recognition unit 5. First, the recognition unit 5 receives, from the acquisition unit 3, a plurality of images acquired at different times, and extracts feature points from each of the plurality of images (each frame) (step S201). Furthermore, because there are usually a plurality of extracted feature points, a set of a plurality of feature points may be defined as a feature point group.

The feature points extracted in step S201 are suitable as long as they are feature points that each have a feature quantity vector, referred to as a descriptor, calculated therefor. For example, it is possible to use scale-invariant feature transform (SIFT) feature points or speeded up robust features (SURF) feature points. Furthermore, the SIFT feature point extraction method is disclosed in, for example, U.S. Pat. No. 6,711,293. The SURF extraction method is disclosed in, for example, H. Bay et al., "SURF: Speeded Up Robust Features", *Computer Vision and Image Understanding*, vol. 110, no. 3, pp. 346-359, 2008.

Next, the recognition unit 5 determines whether or not to implement collating of the feature point groups (which may also be referred to as second feature point groups) extracted by the recognition unit 5 in step S201, and whether the candidate feature point groups of all of the recognition subjects stored in the storage unit 4 has been completed (step S202). Furthermore, for the feature point groups of the recognition subjects stored in the storage unit 4, the aforementioned SIFT feature points or SURF feature points are stored in advance. In step S202, if the collating has not been completed (step S202: NO), the recognition unit 5 selects one arbitrary recognition subject stored in advance in the storage unit 4 (step S203). Next, the recognition unit 5 reads out, from the storage unit 4, the feature point group of the recognition subject selected in step S203 (step S204). The recognition unit 5 selects one arbitrary feature point from the feature point group extracted in step S204 (step S205).

The recognition unit 5 searches for an association between the one feature point selected in step S205, and the feature points of the selected recognition subject read out in step S204. The search method is suitable as long as it is matching processing implemented by a general corresponding point search. To be specific, the recognition unit 5 calculates the respective distances d between the one feature point selected in step S205 and the feature point group of the selected recognition subject read out in step S204 (step S206).

Next, the recognition unit 5 determines a threshold value in order to determine the appropriateness of the association of the feature points. To be specific, in step S206, the recognition unit 5 calculates the smallest value d1 of the calculated distances d, and calculates the second smallest value d2. The recognition unit 5 determines whether or not the conditions that the distances of d1 and d2 are equal to or greater than a predetermined distance (for example, d1 being a value that is smaller than a value produced by multiplying d2 by 0.6) and d1 is equal to or less than a predetermined value (for example, less than 0.3) are satisfied, which constitutes the threshold value determination (step S207). If the conditions for threshold value determination are satisfied in step S207 (step S207: YES), the recognition unit 5 associates the feature points (step S208). If the conditions are not satisfied (step S207: NO), processing is advanced to step S209 without the feature points being associated.

The recognition unit 5 determines whether the feature point group read out in step S204 and the feature point groups extracted in step S201 have all been collated (step S209). If the collation processing has been completed (step S209: YES), in step S202, the recognition unit 5 advances the processing to step S210 if all of the collating has finished (step S202: YES). If the collation processing is not complete (step S209: NO), the recognition unit 5 advances the processing to step S205. The recognition unit 5 recognizes the recognition subject included in the images acquired by the acquisition unit 3, on the basis of the number of feature points associated in step S208 (step S210). Furthermore, the feature point group associated in step S208 and stored in the storage unit 4 may be referred to as first feature points or a first feature point group.

In this way, from the images acquired from the acquisition unit 3, the recognition unit 5 recognizes a recognition subject included in the images. Furthermore, the recognition unit 5 is able to reduce processing costs by determining a key frame for which recognition processing is carried out at each predetermined time, without carrying out the aforementioned recognition processing for all of the plurality of images received from the acquisition unit 3.

Moreover, the recognition unit 5 of FIG. 1 recognizes a movement site of the user from the images received from the acquisition unit 3. The movement site of the user is, for example, a finger. As a method for recognizing a finger, the recognition unit 5 is able to use, for example, a technique disclosed in Japanese Patent No. 3863809 with which a finger location is estimated by image processing. In embodiment 1, for convenience of description, the following description is given in which the recognition unit 5 uses the method disclosed in the aforementioned Japanese Patent No. 3863809. In this method, the recognition unit 5 extracts a hand region outline by picking out (extracting) a color component portion having a skin color for example, from images received from the acquisition unit 3. Thereafter, the recognition unit 5 carries out finger recognition processing from the hand region outline after the number of hands has been recognized. Furthermore, for the extraction of a color component having a skin color, the recognition unit 5 is able to use a suitable threshold value adjustment for RGB space or HSV space. The recognition unit 5 outputs, to the calculation unit 6, a recognition result relating to a recognition subject and a movement site.

The calculation unit 6 is, for example, a hardware circuit implemented by wired logic. In addition, the calculation unit 6 may also be a function module realized with a computer program executed by the image processing device 1. The calculation unit 6 receives, from the recognition unit 5, the recognition result relating to the recognition subject and the movement site. The calculation unit 6 calculates, from a plurality of images acquired at different times by the acquisition unit 3, a movement vector that includes information on the amount of movement of the recognition subject recognized by the recognition unit 5 and on the amount of movement and direction of movement of the movement site of the user. The calculation unit 6 is able to calculate the amount of movement of the recognition subject by using a general technique in which optical flow is used. In addition, the calculation unit 6 is able to use, as a method for calculating a movement vector for a finger which is a movement site of a user, for example, a method in which learning data relating to hand shapes is retained in advance, and the degree of similarity between an image acquired at the present time and the learning data is calculated to estimate the hand shape, as disclosed in Yamashita et al., "Hand Shape Recognition Using a Three-Dimensional Active Appearance Model", Meeting on Image Recognition and Understanding, MIRU2012, IS3-70, 2012-08. The calculation unit 6 is able to determine an arbitrary reference point with respect to an estimated finger, and calculate the amount of movement and direction of movement of the reference point as a movement vector.

Figure 3:
FIG. 3 is a drawing depicting an example of a table including the data structure of the amount of movement of a recognition subject calculated by a calculation unit.

FIG. 3 is a drawing depicting an example of a table including the data structure of the amount of movement of a recognition subject calculated by a calculation unit 6. Furthermore, the calculation unit 6 is able to store the table 30 of FIG. 3 in the cache or memory, which is not depicted, of the calculation unit 6, or store the table 30 in the storage unit 4. In the table 30 of FIG. 3, it is possible for, for example, the upper-left edge of an image acquired by the acquisition unit 3 to be set as a starting point. Furthermore, $T_X$ and $T_Y$, which constitute the location of a recognition subject in an image in the table 30 of FIG. 3, are horizontal and vertical coordinates of an arbitrary reference point of the recognition subject with respect to a starting point in the image, and the units are pixels. It is possible for the arbitrary reference point of the recognition subject to be set to, for example, the center of the recognition subject. In addition, the table 30 of FIG. 3 is an example of the data structure in the case of an envisaged situation in which the capture image resolution of the image capture unit 2 is 640 pixels wide and 480 pixels high, and in video image capture, the recognition subject is present approximately 30 cm in front of the image capture unit 2. Moreover, the table 30 of FIG. 3 indicates a state in which the recognition unit 5 recognizes a recognition subject in a 100th frame (image) from within the captured image, and continuously recognizes the recognition subject also in subsequent frames.

In the table 30 of FIG. 3, in the case where the coordinate values of a recognition subject in an Nth frame are taken as $T_{XN}$ and $T_{YN}$, the calculation unit 6 is able to, for example, calculate a $T_X$ variation amount and a $T_Y$ variation amount in the 101st frame by using the following equation.

$$T_X \text{VariationAmount}_{101} = T_{X101} - T_{X100}$$

$$T_Y \text{VariationAmount}_{101} = T_{Y101} - T_{Y100} \qquad \text{(Equation 1)}$$

The calculation unit 6 calculates, from the table 30 of FIG. 3, the absolute average value for the amount of movement of the recognition subject between predetermined frames. For example, in the case where the predetermined number of frames is five, the absolute average value for the amount of movement of the recognition subject from the 101st frame to the 105th frame is (13.2, 23.2). Furthermore, for convenience of description, the absolute average value for the amount of movement of the recognition subject is referred to as the average amount of movement of the recognition subject. In embodiment 1, if the average amount of movement of the recognition subject is less than a predetermined threshold value, it is determined that the user is closely observing the recognition subject that is the target for work, and is in a "confirmation state" which is the state prior to beginning work. In addition, if the average amount of movement of the recognition subject is equal to or greater than the predetermined threshold value, the calculation unit 6 may instruct the recognition unit 5 to execute recognition processing for the recognition subject, and may continuously execute calculation processing for the average amount of movement of the recognition subject.

It is possible for the aforementioned predetermined threshold value to be appropriately stipulated in accordance with the distance between the image capture unit 2 and the recognition subject, and the imaging view angle and image resolution of the image capture unit 2; however, in the example given in embodiment 1, it is possible for the threshold value to be stipulated as 50 pixels, for example. In the example given in the table 30 of FIG. 3, the average amount of movement of the recognition subject is (13.2, 23.2), and because this is less than the threshold value, the calculation unit 6 determines that the user is in the confirmation state. In this case, the calculation unit 6 may read out, from the storage unit 4, an additional information image corresponding to the recognition subject, and cause the display unit 8 of FIG. 1 to superimpose and display the additional information image on the recognition subject. It is therefore possible for the user to accurately comprehend the recognition subject that is the work target.

If it is determined that the user is in the confirmation state, the calculation unit 6 calculates a movement vector that includes information on the amount of movement and direction of movement of a movement site of the user. Furthermore, in embodiment 1, as mentioned above, a description is given in which a finger serves as an example of a movement site. FIG. 4 is a drawing depicting an example of a table including the data structure of the movement vector of a movement site calculated by the calculation unit 6. Furthermore, the calculation unit 6 is able to store the table 40 of FIG. 4 in the cache or memory, which is not depicted, of the calculation unit 6, or store the table 40 in the storage unit 4. In the table 40 depicted in FIG. 4, it is possible for, for example, the upper-left edge of an image acquired by the acquisition unit 3 to be set as a starting point. Furthermore, $T_X$ and $T_Y$ which constitute the location of a recognition subject indicated in the table 40 of FIG. 4, and $H_X$ and $H_Y$ which constitute the location of a finger are respectively horizontal and vertical coordinates of an arbitrary reference point of the recognition subject and the finger with respect to the starting point of the image, and the units are pixels.

It is possible for the arbitrary reference point of the recognition subject to be set to, for example, the center of the recognition subject, as in the table 30 of FIG. 3. It is possible for the arbitrary reference point of the finger to be set to, for example, the center of an ellipse in the case where the shape of the finger is approximate to an ellipse. In addition, as in the table 30 of FIG. 3, the table 40 of FIG. 4 is an example of a data structure in the case of an envisaged situation in which the capture image resolution of the image capture unit 2 is 640 pixels wide and 480 pixels high, and in video image capture, the recognition subject is present approximately 30 cm in front of the image capture unit 2. Moreover, the table 40 of FIG. 4 indicates a state in which the recognition unit 5 recognizes a finger as well as a recognition subject in a 200th frame (image) from within the captured image, and continuously recognizes the recognition subject and the finger also in subsequent frames.

In the table 40 of FIG. 4, in the case where the coordinate values of a finger in an Nth frame are taken as $H_{XN}$ and $H_{YN}$, the calculation unit 6 is able to calculate a $H_X$ variation amount and a $H_Y$ variation amount in the Nth frame by using the following equation. Furthermore, in the following equation, the $H_X$ variation amount and the $H_Y$ variation amount are calculated from the difference between the relative locations of the Nth frame and the N−1th frame that immediately precedes the Nth frame.

$$H_X\text{VariationAmount}_N = (H_{XN} - T_{XN}) - (H_{XN-1} - T_{XN-1})$$

$$H_Y\text{VariationAmount}_N = (H_{YN} - T_{YN}) - (H_{YN-1} - T_{YN-1}) \quad \text{(Equation 2)}$$

In addition, the calculation unit 6 is able to use the following equation to calculate the movement direction (angle) of the finger in the Nth frame, and the location direction (angle) of the recognition subject corresponding to the location of the finger. Furthermore, in the following equation, FingerMovementDirection$_N$ and RecognitionSubjectLocationDirection$_N$ for which the location of the finger serves as a reference point are calculated from the location of the finger and the location of the recognition subject in the Nth frame and the N−1th frame that immediately precedes the Nth frame.

$$\text{FingerMovementDirection}_N = \arctan(H_X\text{VariationAmount}_N / H_Y\text{VariationAmount}_N)$$

$$\text{RecognitionSubjectLocationDirection}_N = \arctan((T_{XN} - H_{XN})/(T_{YN} - H_{YN})) \quad \text{(Equation 3)}$$

The calculation unit 6 is able to calculate the direction difference in the Nth frame indicated in the table 40 of FIG. 4 by using the following equation. Furthermore, in the following equation, the direction difference is calculated from the absolute value of the difference between FingerMovementDirection$_N$ and RecognitionSubjectLocationDirection$_N$.

$$\text{DirectionDifference} = |\text{FingerMovementDirection}_N - \text{RecognitionSubjectLocationDirection}_N| \quad \text{(Equation 4)}$$

The calculation unit 6 accumulates direction differences over predetermined frames in the table 40 of FIG. 4, and for each frame compares the direction difference with a predetermined threshold value. If a state in which the direction difference is less than the predetermined threshold value over the predetermined frames continues, the calculation unit 6 is able to determine that the finger of the user is moving toward the recognition subject in order for the user to begin work. Furthermore, it is possible for the predetermined threshold value to be appropriately stipulated in accordance with the distance between the image capture unit 2 and the recognition subject, and the imaging view angle and image resolution of the image capture unit 2; however, in embodiment 1, it is possible for the threshold value to be stipulated as 10 degrees, for example. In addition, the threshold value may be referred to as a fourth threshold value. In the table 40 of FIG. 4, for example, in the case where the predetermined number of frames is five, the largest direction difference in the 205th frame from the 201st frame is 9.6 degrees. In this case, because the difference in direction over the predetermined number of frames is less than the threshold value, it is determined that the finger is moving toward the recognition subject.

The calculation unit 6 is able to treat the absolute values of the $H_X$ variation amounts and the $H_Y$ variation amounts indicated in the table 40 of FIG. 4 as the amount of movement (movement speed) of the finger per unit time. If the amount of movement of the finger is equal to or greater than a predetermined threshold value, the calculation unit 6 is able to determine that the finger is moving in order to begin work. It is possible for the predetermined threshold value to be appropriately stipulated in accordance with the distance between the image capture unit 2 and the recognition subject, and the imaging view angle and image resolution of the image capture unit 2; however, in embodiment 1, it is possible for the threshold value to be stipulated as 20 pixels, for example. In the table 40 of FIG. 4, because the smallest absolute value for the $H_X$ variation amount and the $H_Y$ variation amount is 22 pixels which is greater than the predetermined threshold value, the calculation unit 6 determines that the finger is moving in order to begin work. Furthermore, the threshold value may be referred to as a third threshold value. Moreover, a threshold value in which the third threshold value and the fourth threshold value are appropriately combined may be referred to as a first threshold value.

In embodiment 1, if the difference in direction (movement direction) of the finger, which is an example of a movement site of the user, is less than the predetermined threshold value, or the amount of movement is equal to or greater than a predetermined threshold value, it is determined that the user is in an "operation state" for carrying out work with respect to the recognition subject. The calculation unit 6 may use only either one of the difference in direction or amount of movement (movement direction) of the finger, or may use both. In addition, information on the difference in direction (movement direction) and amount of movement of the finger may be referred to as a movement vector. Furthermore, in the case where the operation state is not determined, the calculation unit 6 may instruct the recognition unit 5 to execute recognition processing for the recognition subject, and may continuously execute calculation processing for the data items indicated in the table 40 of FIG. 4. In addition, if the recognition unit 5 has recognized more than one finger, both hands in other words, the calculation unit 6 is able to carry out processing on only the finger that is recognized first by the recognition unit 5. The calculation unit 6, for example, outputs, to the control unit 7, a calculation result that is indicated in the table 40 of FIG. 4 and relates to the recognition subject and the movement site.

The control unit 7 of FIG. 1 is, for example, a hardware circuit implemented by wired logic. In addition, the control unit 7 may also be a function module realized a computer program executed by the image processing device 1. For example, the control unit 7 receives, from the storage unit 4, an additional information image corresponding to the recognition subject recognized by the recognition unit 5. Moreover, the control unit 7 receives, from the calculation unit 6, a recognition result relating to the recognition subject and the movement site. The control unit 7 controls the display location of the additional information image corresponding to the recognition subject, to a location other than the recognition subject and the movement site of the user, and causes the controlled additional information image to be displayed on the display unit 8. In other words, the control unit 7 controls the display location of the additional information image to a location where the recognition subject is between a movement vector and the additional information image, and a location where the distance between the reference location of the recognition subject (for example, a work location that is the location of a work target for the user) and the reference location of the additional information image (for example, the work location) is the shortest.

The control unit 7 performs, for example, rectangular approximation on the recognition subject, and for the directions normal to each side of the approximated rectangular region, calculates the angle with respect to the movement direction of the finger. The control unit 7, for example, compares the movement direction of the finger and the directions normal to each side, and sets the direction in which the interior angle difference is less than a predetermined angle (90° for example) as a display candidate direction for the additional information image. The control unit 7 controls the display location of the additional information image by calculating, in the case where control has been performed for the display location of the additional information image in the display candidate direction, the distance between the work location of the recognition subject and a virtual work location of the recognition subject indicated by the additional information image, and selecting the region in which the distance is the shortest.

Figure 5:
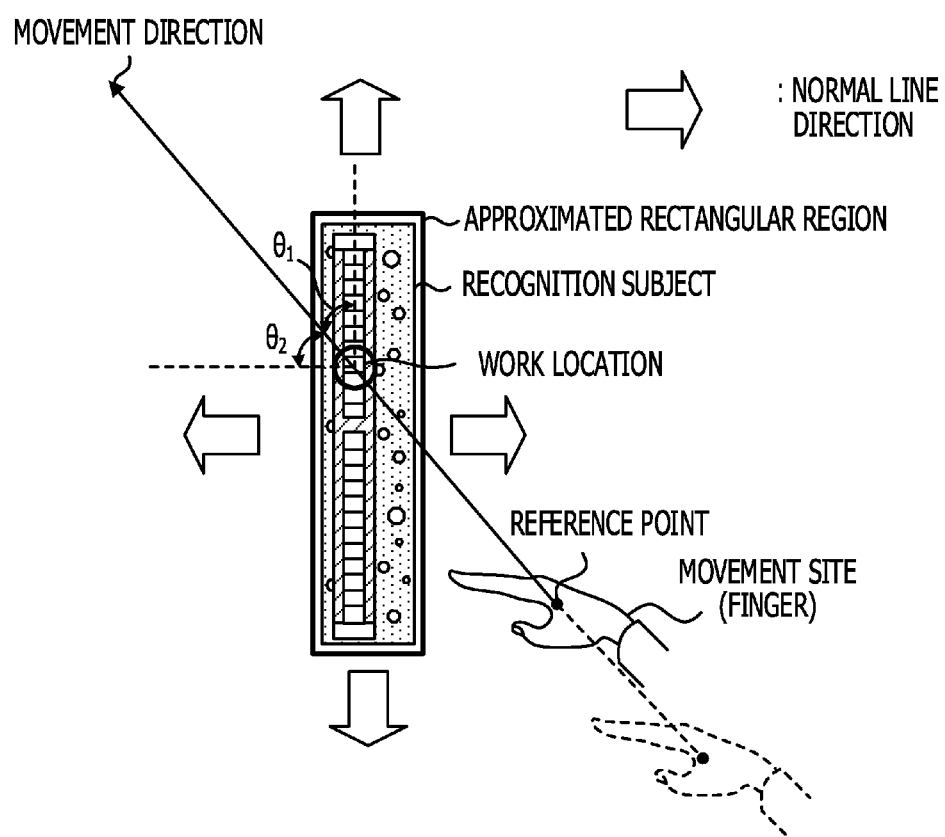
FIG. 5 is a conceptual diagram of a display candidate direction for an additional information image.

FIG. 5 is a conceptual diagram of a display candidate direction for an additional information image. In FIG. 5, the reference point of the finger of the user is advancing with the movement direction being the diagonal upper-left direction. In addition, in FIG. 5, as mentioned above, the control unit 7 performs rectangular approximation on the recognition subject, and for the directions normal to each side of the approximated rectangular region, calculates the angle with respect to the movement direction of the finger. In FIG. 5, because $\theta_1$ and $\theta_2$ constitute internal angle differences of less than 90°, the upper direction and the left direction are display candidate directions for the additional information image with respect to the work location of the recognition subject.

FIG. 6A is a relational diagram of the work location of a recognition subject and line segments in each side of an approximated rectangular region. FIG. 6B is a drawing depicting an example of the data structure of line segments of each side in an approximated rectangular region. FIG. 6C is a conceptual diagram of a display candidate location for an additional information image. The size of the recognition subject and the approximated rectangular region of FIG. 6A is dependent upon the imaging conditions of the image capture unit 2. In addition, the work location coordinates ($W_X$, $W_Y$) are, for example, associated with the recognition subject and stored in the storage unit 4 in advance. Furthermore, it is possible for the starting point for the work location coordinates ($W_X$, $W_Y$) to be, for example, the upper-left edge of an image acquired by the acquisition unit 3. The table 60 of FIG. 6B indicates a basic distance to each edge of the approximated rectangular region in which the work location of the recognition subject stored in the storage unit 4 serves as a reference point. In other words, the table 60 of FIG. 6B indicates relative distances, which are not dependent upon the imaging conditions of the image capture unit 2, to each side of the approximated rectangular region in which the work location of the recognition subject serves as a reference point. Furthermore, the control unit 7 is capable of selecting, from the storage unit 4, an additional information image corresponding to the orientation of the recognition subject acquired by the acquisition unit 3, and is capable of enlarging or shrinking the additional information image to the same size as the recognition subject. Therefore, even in the case where the recognition subject and the additional information image are superimposed and displayed, the control unit 7 is able to enlarge or shrink the additional information image in accordance with the image size (area) of the recognition subject. Here, if the enlargement/shrinking ratio is taken as $\alpha$ ($\alpha=5$ for example), using the variety of data indicated in FIG. 6B, the distances of the line segments of each side depicted in FIG. 6A are able to be calculated using the following equation.

$$S_T = \alpha \times S_{OT}$$

$$S_L = \alpha \times S_{OL}$$

$$S_B = \alpha \times S_{OB}$$

$$S_R = \alpha \times S_{OR} \quad \text{(Equation 5)}$$

In FIG. 6C, if the distance between a virtual work location of the additional information image and the work location of the recognition subject in the case where the additional information image is displayed in the direction above the recognition subject is taken as LT, and the distance between the work locations in the case where the additional information image is displayed in the direction to the left of the recognition subject is taken as LL, the distance LT and the distance LL are calculated as in the following equations.

$$LT = S_T + S_B = 95$$

$$LL = S_R + S_L = 20 \quad \text{(Equation 6)}$$

Furthermore, the units in the aforementioned equation 6 are pixels. Since the distance LL is the shortest distance, the control unit 7 controls the region location that satisfies the conditions of the distance LL, as the display location of the additional information image. Furthermore, the control unit 7 may perform control in such a way that the additional information image is displayed without providing a gap between the additional information image and the recognition subject. The control unit 7 outputs, to the display unit 8, the additional information for which the display location has been controlled.

The control unit 7 is able to calculate the work location coordinates ($W_X$, $W_Y$) and the inclination of each side of the approximated rectangular region, from the location, the orientation, and the area and the like in an image of the recognition subject that may vary due to the imaging conditions of the image capture unit 2. As depicted in FIG. 6A, the control unit 7 may calculate the distances of the line segments of each side of the approximated rectangular region by using the inclination of each side of the approximated rectangular region and the coordinate values of the work location. The distances of the line segments of each side of the approximated rectangular region are, for example, $S_T=40$, $S_L=8$, $S_B=55$, and $S_R=12$.

The display unit 8 in FIG. 1 is, for example, a display device such as a display. The display unit 8 receives, from the control unit 7, an additional information image for which the display location has been controlled, and receives, from the acquisition unit 3, an image acquired by the acquisition unit 3. The display unit 8 superimposes and displays the additional information image for which the display location has been controlled, on the image acquired by the acquisition unit 3.

The processing unit 9 is, for example, a hardware circuit implemented by wired logic. In addition, the processing unit 9 may also be a function module realized with a computer program executed by the image processing device 1. The processing unit 9 may have, in accordance with a desire, the functions of the acquisition unit 3, the recognition unit 5, the calculation unit 6, and the control unit 7, and may carry out the functions. Furthermore, a processing unit 9 may be retained outside of the image processing device 1.

Furthermore, with regard to the image processing device 1, the function units of the image processing device 1 may be configured by integrated circuits such as an application-specific integrated circuit (ASIC) or a field-programmable gate array (FPGA). Furthermore, in the case where, after the additional information image has been superimposed and displayed, a movement site of the user has not been recognized over an arbitrary predetermined number of frames in the images acquired by the acquisition unit 3, the image processing device 1 may determine that the work state of the user has moved from the operation state to the confirmation state, and may superimpose and display an additional information image at the location of the recognition subject.

Figure 7:
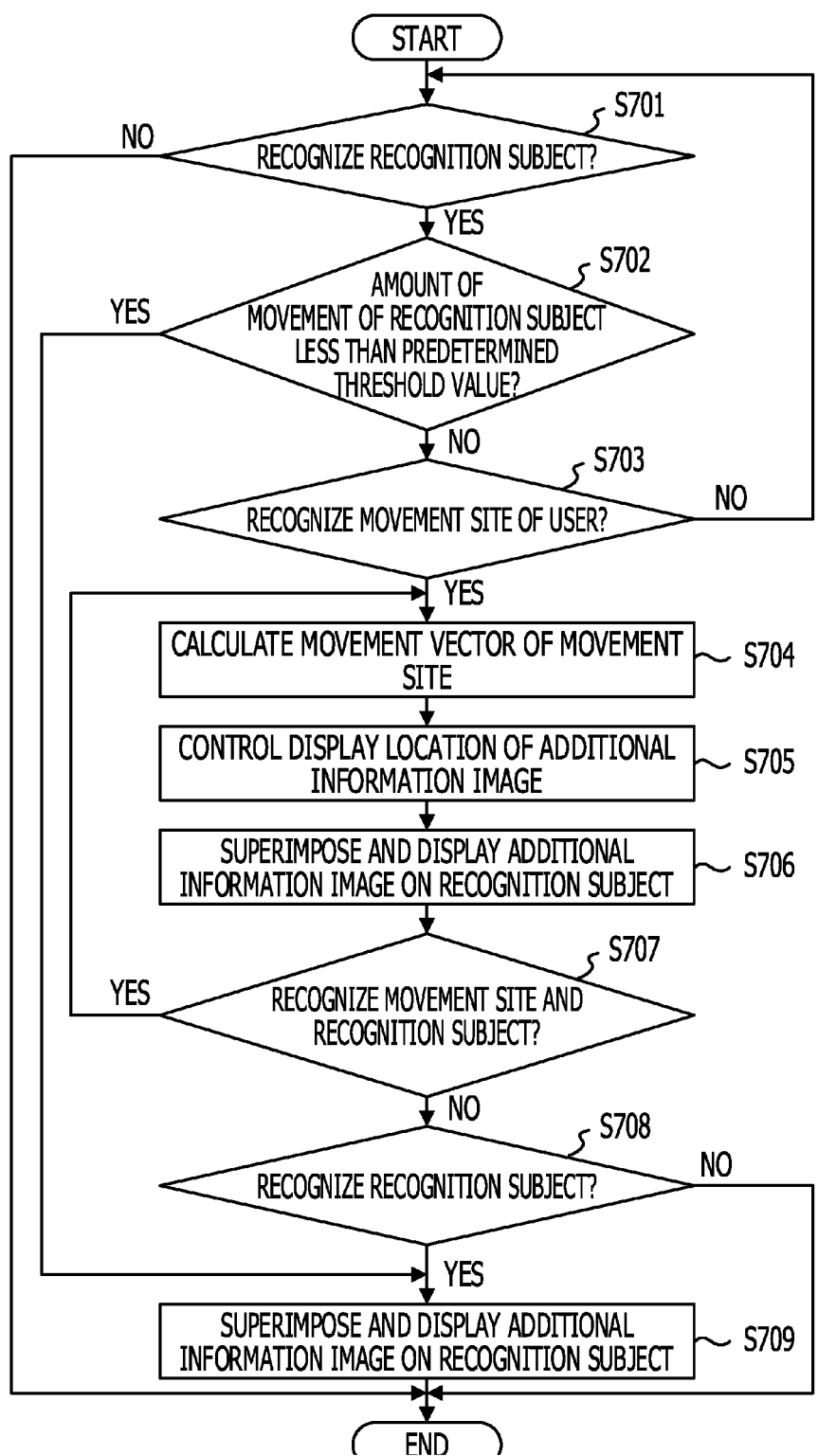
FIG. 7 is a flowchart for image processing in an image processing device.

FIG. 7 is a flowchart for image processing in an image processing device 1. The recognition unit 5 receives, from the acquisition unit 3, an image captured by the image capture unit 2, and with respect to the image, carries out recognition processing for a recognition subject (step S701). If the recognition unit 5 does not recognize the recognition subject (step S701: NO), the image processing is finished. If the recognition unit 5 has recognized the recognition subject (step S701: YES), the calculation unit 6 calculates the amount of movement of the recognition subject (step S702). Furthermore, the data structure for the amount of movement of the recognition subject calculated by the calculation unit 6 is suitable as long as it is, for example, the data structure indicated in the table 30 of FIG. 3.

If the amount of movement of the recognition subject calculated by the calculation unit 6 is less than a predetermined threshold value (step S702: YES), the calculation unit 6 reads out an additional information image corresponding to the recognition subject from the storage unit 4, and causes the display unit 8 to superimpose and display the additional information image on the recognition subject (step S709). If the amount of movement of the recognition subject calculated by the calculation unit 6 is equal to or greater than the predetermined threshold value (step S702: NO), the recognition unit 5 carries out recognition processing for a movement site of the user from the image (step S703).

If the recognition unit 5 does not recognize a movement site of the user from the image (step S703: NO), the image processing of step S701 is executed. If the recognition unit 5 has recognized a movement site of the user from the image (step S703: YES), the calculation unit 6 calculates a movement vector including information on the amount of movement and direction of movement of the movement site of the user (step S704). Furthermore, the data structure of the movement vector for the movement site calculated by the calculation unit 6 is suitable as long as it is, for example, the data structure indicated in the table 40 of FIG. 4.

The control unit 7 controls the display location of the additional information image in accordance with the movement vector and a predetermined threshold value (step S705). In step S705, the control unit 7, for example, controls the display location of the additional information image to a location where the recognition subject is between the movement vector and the additional information image, and a location where the distance between the reference location of the recognition subject (for example, a work location which is the location of a work target for the user) and the reference location of the additional information image (for example, a work location) is the shortest. Next, for example, the control unit 7 reads out, from the storage unit 4, the additional information image corresponding to the recognition subject, and causes the display unit 8 to superimpose and display the additional information image on the recognition subject (step S706).

With respect to images having different times received from the acquisition unit 3, the recognition unit 5 carries out recognition processing for a movement site and a recognition subject (step S707). If the recognition unit 5 has recognized a movement site and a recognition subject (step S707: YES), the image processing of step S704 is executed. If the recognition unit 5 does not recognize a movement site and a recognition subject (step S707: NO), recognition processing for a recognition subject is executed with respect to an image that is a processing target for the recognition unit 5 (step S708). In step S708, if the recognition unit 5 does not recognize a recognition subject (step S708: NO), the image processing is finished.

If the recognition unit 5 has recognized a recognition subject (step S708: YES), for example, the calculation unit 6 reads out, from the storage unit 4, an additional information image corresponding to the recognition subject, the display unit 8 is made to superimpose and display the additional information image on the recognition subject (step S709), and the image processing is finished. Furthermore, while the acquisition unit 3 continues to acquire images, the image processing device 1 may repeatedly execute the processing steps S701 to S709.

In the image processing device 1 in embodiment 1, in the "confirmation state", the image processing device 1 superimposes and displays the additional information image in the same location as the recognition subject, and, in the "operation state", displays the additional information image in a region which is adjacent to the recognition subject and with which work sites are able to be easily compared, and a region which does not interfere with the movement site of the user, and it is therefore possible for both the visibility of the additional information image and operability for the user to be improved.

Embodiment 2

In embodiment 1, the image processing device 1 carries out image processing with there being one movement site of the user, but in embodiment 2 a description is given with respect to image processing in which a plurality of movement sites are targeted. In embodiment 2, for example, a case is envisaged in which, after an additional information image has been displayed in a location corresponding to the movement direction of a right-hand finger, examples of which are depicted in FIG. 5 and FIG. 6C, a left-hand finger is included in an image captured by the image capture unit 2, in accordance with the work performed by the user with respect to the recognition subject.

The image processing device 1 calculates the movement direction of the left-hand finger in the same way as in embodiment 1, and displays an additional information image in a direction that does not interfere with the movement direction of the right-hand finger or the movement direction of the left-hand finger. In FIG. 6C, the image processing device 1 displays an additional information image in the direction above the recognition subject. Moreover, the image processing device 1 in embodiment 2 additionally controls the display location of the additional information image if either of the left-hand finger or the right-hand finger is in a location that interferes with the additional information image. Furthermore, in embodiment 2, a description is given of an example case in which the left-hand finger is in a location that interferes with the additional information image.

The calculation unit 6 is able to similarly calculate the location of the left-hand finger which is one movement sight of the user by using the method given in embodiment 1, carry out a comparison with the display location of the additional information image that has been controlled by the control unit 7, and determine whether or not the location of the left-hand finger interferes with the location of the additional information image. If the left-hand finger interferes with the additional information image, the control unit 7 searches for a region in which the additional information image is not superimposed on the recognition subject, and in which the additional information image does not interfere with the left-hand finger or the right-hand finger.

Figure 8A:
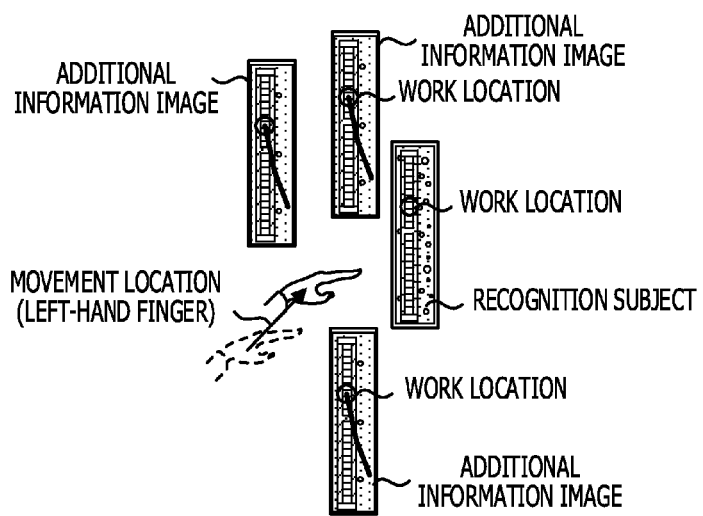
FIG. 8A is a first conceptual diagram of a search for a display region for an additional information image.

FIG. 8A is a first conceptual diagram of a search for a display region for an additional information image. In FIG. 8A, a search is performed for a plurality of first display candidate locations for the additional information image, which constitute regions in which the additional information image is not superimposed on the recognition subject, and in which the additional information image does not interfere with the left-hand finger or the right-hand finger. Although three examples of first display candidates locations are given in FIG. 8A, the number of first display candidate locations is not particularly restricted.

In the case where the work location of the recognition subject serves as a starting point, the control unit 7 carries out narrowing-down processing in which a region where the angle variation of the work location of an additional information image in a first display candidate location is less than a predetermined threshold value serves as a second display candidate region. Next, in a plurality of second display candidate regions, the control unit 7 ultimately selects a third display candidate region in which the variation in the distance between work locations is the smallest. The control unit 7 controls the third display location region ultimately selected, as the display location for the additional information image.

Figure 8B:
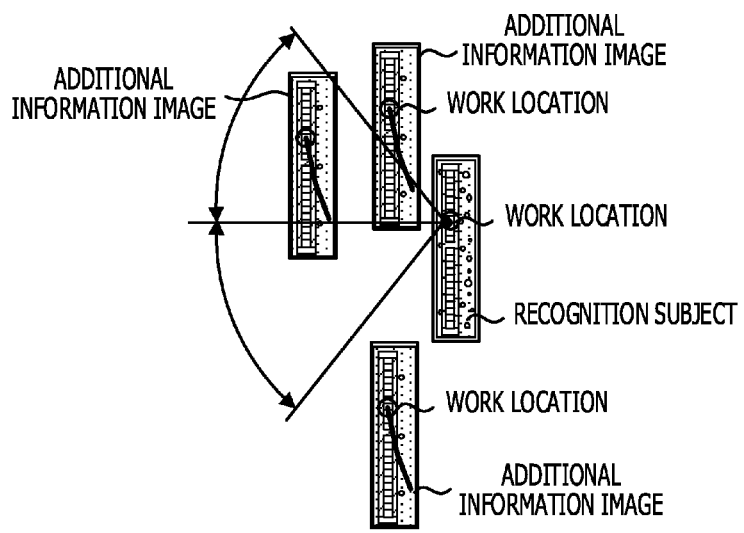
FIG. 8B is a second conceptual diagram of a search for a display region for an additional information image.
Figure 8C:
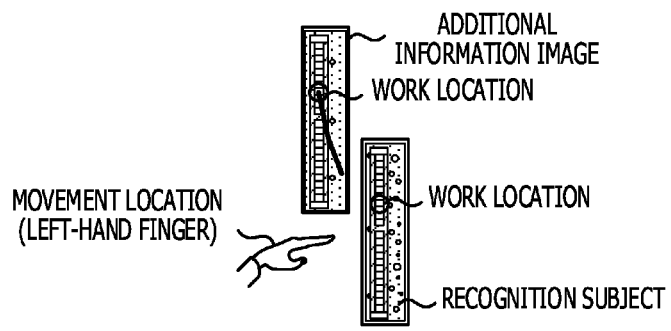
FIG. 8C is a third conceptual diagram of a search for a display region for an additional information image.

FIG. 8B is a second conceptual diagram of a search for a display region for an additional information image. FIG. 8C is a third conceptual diagram of a search for a display region for an additional information image. In FIG. 8B, the control unit 7 calculates angles formed by straight lines that join the work point of the recognition subject and the work points of additional information images in second display candidate regions. In FIG. 8B, the control unit 7 sets the two first display candidate regions to the upper left of the recognition subject as second display candidate regions because the angles thereof are less than a predetermined angle, but excludes the lower-left first display region because the angle variation thereof is large. As depicted in FIG. 8C, the control unit 7 ultimately selects a third display candidate region in which the variation in the distance between work locations is the smallest.

In the image processing device 1 disclosed in embodiment 2, even in the case where a plurality of movement sites of the user are recognized in an image, both the visibility of the additional information image and operability for the user are able to be improved.

Embodiment 3

In embodiment 2, if the finger of the user and the display location of the additional information image interfere, a case may also be envisaged in which, when the display location of the additional information image is controlled, the distance from the recognition subject increases, and it becomes difficult to compare and observe the additional information image and the recognition subject. The control unit 7 of the image processing device in embodiment 3 calculates the distances between the work locations of additional information images in a plurality of second display candidate locations in FIG. 8B and the work location of a recognition subject, and compares the distances with an arbitrary predetermined threshold value. If the distances between the work locations are greater than the threshold value, the control unit 7 of the image processing device 1 selects, from the storage unit 4, an additional information image having a small display size that satisfies the condition of being less than the threshold value, from among the additional information images corresponding to the recognition subject. However, every additional information image also includes a work location, and the display size is decreased by cutting away regions other than the work location. Furthermore, a plurality of additional information images having different display sizes are stored in advance in the storage unit 4.

If an additional information image having a display size that satisfies the condition of being less than the threshold value is not stored in the storage unit 4, the control unit 7 of the image processing device 1 selects the additional information image with which the distance between work locations is the shortest. Furthermore, it is possible for the aforementioned threshold value to be appropriately stipulated in accordance with the conditions at which the image capture unit 2 captures images; however, in the case where the capture image resolution is 640 pixels wide and 480 pixels high, it is possible for 200 pixels (approximately one third of the long side of the screen size) to be stipulated as the threshold value. Furthermore, the threshold value may be referred to as a second threshold value.

In the image processing device 1 in embodiment 3, because it is possible for the size of the additional information image to be altered in accordance with the display location, both the visibility of the additional information image and operability for the user are able to be improved.

Embodiment 4

In embodiment 1 or embodiment 2, a case may also be envisaged in which the location of the recognition subject is at the peripheral edge of an image acquired by the acquisition unit 3. In this case, part of the display location of the additional information image protrudes outside of the image, and it becomes difficult to compare and observe the recognition subject and the additional information image. In other words, if the additional information image is outside of the display region of the display unit 8, a case is also envisaged in which it becomes difficult to compare and observe the recognition subject and the additional information image. The control unit 7 of the image processing device 1 in embodiment 4 calculates coordinate values at points on each side of a controlled additional information image. Furthermore, it is possible for the starting point for the coordinate values to be, for example, the upper-left edge of an image acquired by the acquisition unit 3. If the coordinate values of any of the points are negative values, because part of the additional information image is protruding outside of the image, the control unit 7 of the image processing device 1 selects, from the storage unit 4, an additional information image having a small display size that is able to be displayed within the image. However, every additional information image also includes a work location, and the display size is decreased by cutting away regions other than the work location. Furthermore, a plurality of additional information images having different display sizes are stored in advance in the storage unit 4. If an additional information image having a display size that satisfies the conditions is not stored in the storage unit 4, the control unit 7 of the image processing device 1 selects an additional information image in which the absolute value of the negative coordinate value is the smallest. Furthermore, the control unit 7 of the image processing device 1 may use, as an additional information image having an altered size, an image in which only the vicinity of the work location of the additional information image has been cut away.

In the image processing device 1 in embodiment 4, in the case where a controlled additional information image protrudes outside of an image, because it is possible for the size of the additional information image to be altered in accordance with the display location (because a predetermined region including the work location is selected from the additional information image and displayed in such a way that the predetermined region fits inside the display region of the display unit 8), both the visibility of the additional information image and operability for the user are able to be improved.

Figure 9:
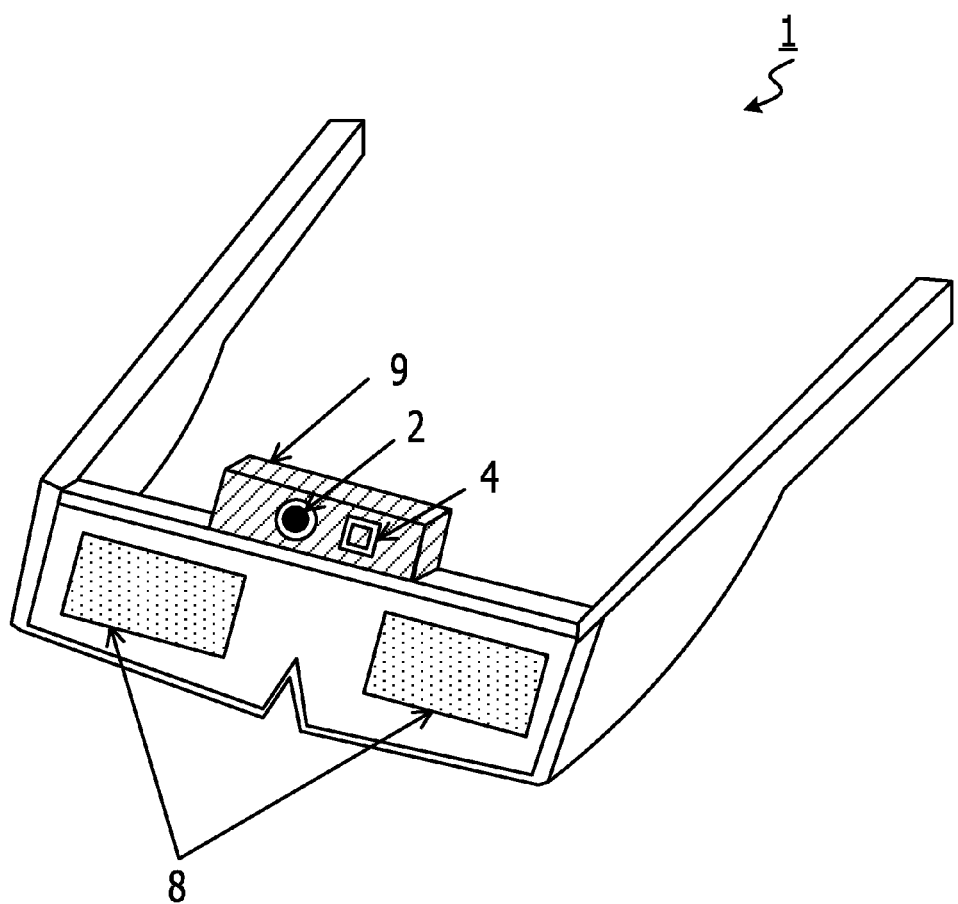
FIG. 9 is a first hardware configuration diagram of an image processing device according to one mode of embodiment.

FIG. 9 is a first hardware configuration diagram of an image processing device according to one mode of embodiment. In FIG. 9, in order for it is to be easy for a recognition subject being closely observed by the user in the external environment to be designated, a spectacles-type housing may be used and the image capture unit 2 may be provided so as to be located in the center between both eyes. In addition, although not depicted, two or more image capture units 2 may be provided and a stereoscopic image may be used. The display unit 8 may use a see-through type display so that the external environment is able to be perceived.

Embodiment 5

Figure 10:
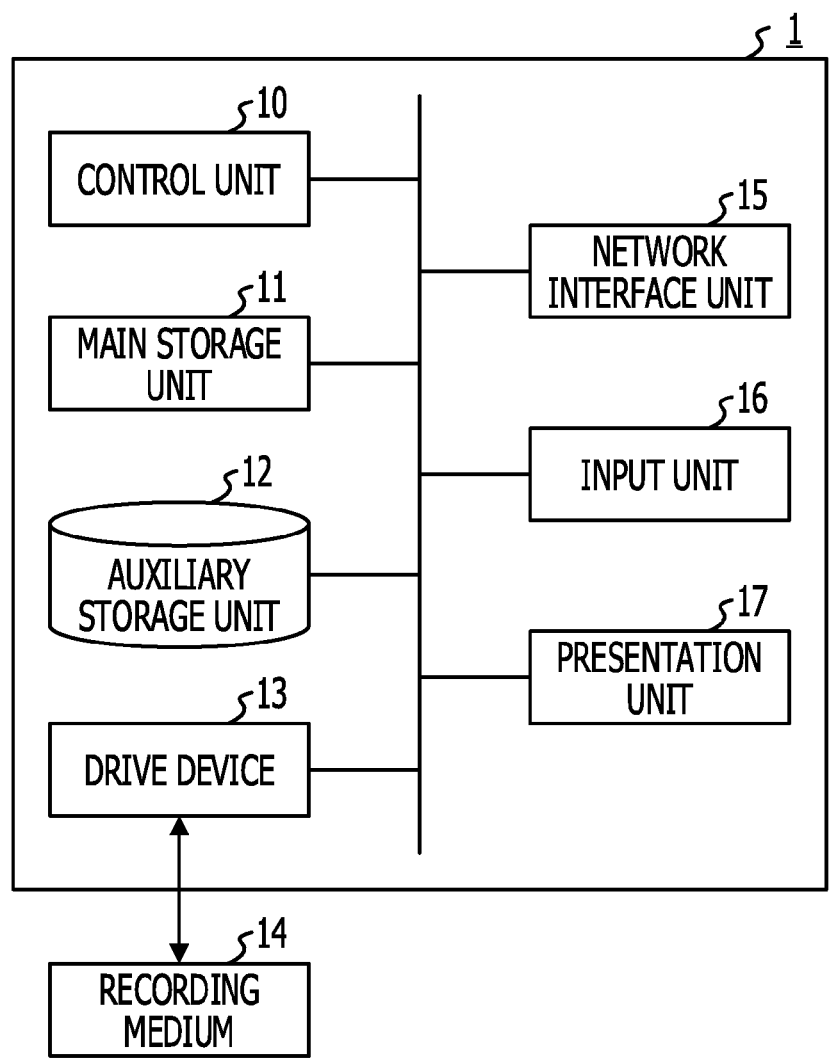
FIG. 10 is a second hardware configuration diagram of an image processing device according to one mode of embodiment.

FIG. 10 is a second hardware configuration diagram of an image processing device according to one mode of embodiment. As depicted in FIG. 10, the image processing device 1 includes a control unit 10, a main storage unit 11, an auxiliary storage unit 12, a drive device 13, a network interface unit 15, an input unit 16, and a presentation unit 17. These constructions are connected via a bus in such a way that data is able to be mutually transmitted and received.

The control unit 10 is a CPU that controls the devices and calculates and processes data within a computer. In addition, the control unit 10 is a computation device that executes programs stored in the main storage unit 11 and the auxiliary storage unit 12, and receives, calculates, and processes data from the input unit 16 and external storage devices, and then outputs the data to the presentation unit 17 and the storage devices and so on.

The main storage unit 11 is a read-only memory (ROM) or a random-access memory (RAM) or the like, and is a storage device that stores or temporarily saves data and programs such as an OS and application software which are basic software executed by the control unit 10.

The auxiliary storage unit 12 is a hard disk drive (HDD) or the like, and is a storage device that stores data relating to the application software and so on.

The drive device 13 reads out a program from a recording medium 14, a flexible disk for example, and installs the program in the auxiliary storage unit 12.

In addition, a predetermined program is stored on the recording medium 14, and the program stored on this recording medium 14 is installed in the image processing device 1 by way of the drive device 13. It becomes possible for the installed predetermined program to be executed by the image processing device 1.

The network interface unit 15 is an interface for the image processing device 1 and a peripheral device having a communication function and connected via a network such as a local area network (LAN) or a wide area network (WAN) constructed using data transmission paths such as wired and/or wireless circuits.

The input unit 16 has a keyboard provided with cursor keys, numeral input keys, and a variety of function keys and so on, and a mouse or a touchpad or the like for performing the selection and so on of keys on the display screen of the presentation unit 17. In addition, the input unit 16 is a user interface for the user to give operation instructions to the control unit 10 and to input data.

The presentation unit 17 is constructed from a cathode ray tube (CRT) or a liquid crystal display (LCD) or the like, and carries out display corresponding to display data input from the control unit 10.

Furthermore, the aforementioned image processing may be realized as a program to be executed by a computer. It is possible for the aforementioned image processing to be realized by causing this program to be installed from a server or the like and executed by a computer. In addition, it is possible for this program to be recorded on the recording medium 14, the recording medium 14 on which this program is recorded to be read by a computer or a mobile terminal, and the aforementioned image processing to be realized. Furthermore, for the recording medium 14, it is possible to use a variety of types of recording media such as a recording medium that optically, electrically, or magnetically records information in the same way as a CD-ROM, a flexible desk, or a magneto-optical disk or the like, or a semiconductor memory or the like that electrically records information in the same way as a ROM or a flash memory or the like.

In addition, the constituent elements of the depicted devices may be physically configured in a way other than that depicted. In other words, the specific form in which the devices are distributed or integrated is not restricted to that depicted, and the entirety or a portion thereof may be configured by being functionally or physically distributed or integrated in arbitrary units in accordance with various loads and the usage state and so on. In addition, it is possible for the various processing described in the aforementioned embodiments to be realized by executing a pre-prepared program using a computer such as a personal computer or a workstation.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An image processing device comprising:
   a processor; and
   a memory which stores an instruction, which when executed by the processor, cause the processor to execute:
   acquiring an image including a subject recognized and a movement site of a user;
   recognizing the subject recognized and the movement site from the image;
   controlling a display location, in the image, of an additional information image corresponding to the subject recognized, to a location other than the subject recognized and the movement site
   calculating a movement vector of the movement site from a plurality of the images, and
   wherein, in the controlling, the display location of the additional information image is controlled based on the location of the subject recognized and the movement vector.

2. The device according to claim 1,
   wherein, in the recognizing, an access is made to a storage unit configured to store a first feature point that corresponds to the subject recognized and the first feature point has been extracted in advance, and
   wherein a second feature point is extracted from the image, and, the recognizing of the subject is implemented by associating the first feature point and the second feature point.

3. The device according to claim 1,
   wherein, in the controlling,
   when the movement vector is equal to or greater than a predetermined first threshold value, the display location of the additional information image is controlled to the location other than the subject recognized and the movement site,
   when the movement vector is less than the first threshold value, the display location of the additional information image is controlled to be superimposed on the subject recognized.

4. The device according to claim 3,
   wherein, in the controlling, the display location of the additional information image is controlled in a direction of the movement vector, and in a direction in which an interior angle difference of directions normal to each side of an approximated rectangular region which is a rectangular approximation of the subject recognized is less than a predetermined angle.

5. The device according to claim 3,
   wherein the movement vector has components for a movement amount and a movement direction of the movement site, and the first threshold value has a predetermined third threshold value for the movement amount, and a predetermined fourth threshold value for the movement direction.

6. The device according to claim 1,
   wherein, in the controlling, when the movement vector is equal to or greater than a predetermined first threshold value, the display location of the additional information image is controlled
   to a location where the subject recognized is between the movement vector and the additional information image, and
   to a location where a distance between a reference location of the subject recognized and a reference location of the additional information image is a shortest distance.

7. The device according to claim 6,
   wherein, in the controlling, if the shortest distance is equal to or greater than a predetermined second threshold value, a predetermined region is selected from the additional information image in such a way that the shortest distance is less than the second threshold value, and the predetermined region is displayed.

8. The device according to claim 7,
   wherein the predetermined region includes a work location associated with the subject recognized.

9. The device according to claim 6, further comprising:
   a display unit configured to display the additional information image,
   wherein, in the controlling, when a part of the additional information image is outside of a display region of the display unit, a predetermined region that is within the display region of the display unit is selected from the additional information image, and the display region is displayed.

10. The device according to claim 1, further comprising capturing an image including the subject recognized and the movement site of the user, wherein, in the acquiring, the image is acquired by the capturing.

11. An image processing method comprising:
    acquiring an image including a subject recognized and a movement site of a user;
    recognizing, by a computer processor, the subject recognized and the movement site from the image;
    controlling a display location, in the image, of an additional information image corresponding to the subject recognized, to a location other than the subject recognized and the movement site; and calculating a movement vector of the movement site from a plurality of the images, and wherein, in the controlling, the display location of the additional information image is controlled based on the location of the subject recognized and the movement vector.

12. The method according to claim 11, wherein, in the recognizing, an access is made to a storage unit configured to store a first feature point that corresponds to the subject recognized and the first feature point has been extracted in advance, and wherein a second feature point is extracted from the image, and, the recognizing of the subject is implemented by associating the first feature point and the second feature point.

13. The method according to claim 11, wherein, in the controlling, when the movement vector is equal to or greater than a predetermined first threshold value, the display location of the additional information image is controlled to the location other than the subject recognized and the movement site, when the movement vector is less than the first threshold value, the display location of the additional information image is controlled to be superimposed on the subject recognized.

14. The method according to claim 11, wherein, in the controlling, when the movement vector is equal to or greater than a predetermined first threshold value, the display location of the additional information image is controlled to a location where the subject recognized is between the movement vector and the additional information image, and to a location where a distance between a reference location of the subject recognized and a reference location of the additional information image is a shortest distance.

15. The method according to claim 14, wherein, in the controlling, if the shortest distance is equal to or greater than a predetermined second threshold value, a predetermined region is selected from the additional information image in such a way that the shortest distance is less than the second threshold value, and the predetermined region is displayed.

16. The method according to claim 15, wherein the predetermined region includes a work location associated with the subject recognized.

17. The method according to claim 14, further comprising:

displaying the additional information image, wherein, in the controlling, when a part of the additional information image is outside of a display region of the displaying, a predetermined region that is within the display region of the displaying is selected from the additional information image, and the display region is displayed.

18. A non-transitory computer-readable storage medium storing an image processing program that causes a computer to execute a process comprising:

acquiring an image including a subject recognized and a movement site of a user;

recognizing the subject recognized and the movement site from the image;

controlling a display location, in the image, of an additional information image corresponding to the subject recognized, to a location other than the subject recognized and the movement site, calculating a movement vector of the movement site from a plurality of the images, and wherein, in the controlling, the display location of the additional information image is controlled based on the location of the subject recognized and the movement vector.

* * * * *